(12) United States Patent
Pump

(10) Patent No.: US 9,902,263 B2
(45) Date of Patent: Feb. 27, 2018

(54) MULTI-PLATE FRICTION CLUTCH HAVING CENTER LUBRICANT FEED AND LUBRICANT EVACUATION CAPABILITIES

(71) Applicant: American Axle & Manufacturing, Inc., Detroit, MI (US)

(72) Inventor: Christopher D. Pump, Macomb, MI (US)

(73) Assignee: AMERICAN AXLE & MANUFACTURING, INC., Detroit, MI (US)

(*) Notice: Subject to any disclaimer, the term of this patent is extended or adjusted under 35 U.S.C. 154(b) by 317 days.

(21) Appl. No.: 14/950,317

(22) Filed: Nov. 24, 2015

(65) Prior Publication Data

US 2017/0144542 A1 May 25, 2017

(51) Int. Cl.
| | |
|---|---|
| F16H 57/04 | (2010.01) |
| B60K 17/35 | (2006.01) |
| F16D 13/52 | (2006.01) |
| F16D 13/74 | (2006.01) |
| F16D 25/0638 | (2006.01) |
| F16D 25/12 | (2006.01) |
| F16H 48/08 | (2006.01) |

(52) U.S. Cl.
CPC ............ B60K 17/35 (2013.01); F16D 13/52 (2013.01); F16D 13/74 (2013.01); F16D 25/0638 (2013.01); F16D 25/123 (2013.01); F16H 57/0473 (2013.01); F16H 57/0483 (2013.01); *F16D 2300/0214* (2013.01); *F16H 48/08* (2013.01)

(58) Field of Classification Search
CPC ............. F16H 57/0421; F16H 57/0473; F16H 57/0483; F16H 57/04; B60K 17/35
See application file for complete search history.

(56) References Cited

U.S. PATENT DOCUMENTS

| | | | | |
|---|---|---|---|---|
| 5,069,305 A | * | 12/1991 | Kobayashi | ............ B60K 17/35 180/249 |
| 8,215,440 B2 | | 7/2012 | Hoffmann et al. | |
| 8,316,738 B2 | | 11/2012 | Hellinger et al. | |
| 8,845,473 B2 | | 9/2014 | Nett et al. | |

(Continued)

OTHER PUBLICATIONS

U.S. Appl. No. 62/114,657, filed Feb. 11, 2015. Application Titled "Clutch Assembly With Fluid Evacuation".

*Primary Examiner* — Huan Le
(74) *Attorney, Agent, or Firm* — Harness, Dickey & Pierce, P.L.C.

(57) ABSTRACT

A clutched device can include a differential and first and second conduits. The differential can transmit differential power to first and second outputs. Clutch plates can rotate through a clutch cavity and transmit power between the second output and a third output. An outer carrier and an inner carrier can be coupled for rotation with the second and third outputs, respectively. The first conduit can be open to a first peripheral region of the clutch cavity and fluidly couples the first region to a cavity separate from the clutch cavity. The second conduit can be open to a second peripheral region that is circumferentially spaced apart from the first region. The second conduit can fluidly couple the second region to a central region of the clutch cavity. Rotation of the outer carrier in opposite rotational directions slings lubricant to the first and second conduits, respectively.

20 Claims, 3 Drawing Sheets

(56) References Cited

U.S. PATENT DOCUMENTS

| | | |
|---|---|---|
| 2001/0011622 A1 | 8/2001 | Arai et al. |
| 2002/0139634 A1 | 10/2002 | Porter |
| 2005/0230214 A1 | 10/2005 | Puiu |
| 2007/0111842 A1 | 5/2007 | Suzuki et al. |
| 2014/0231209 A1* | 8/2014 | Nett .................... F16H 57/0424 192/85.01 |
| 2014/0231211 A1 | 8/2014 | Nett et al. |
| 2014/0342866 A1* | 11/2014 | Valente .................. F16H 48/08 475/86 |
| 2015/0057123 A1 | 2/2015 | Phelps et al. |

\* cited by examiner

MULTI-PLATE FRICTION CLUTCH HAVING CENTER LUBRICANT FEED AND LUBRICANT EVACUATION CAPABILITIES

FIELD

The present disclosure relates to a clutched device having a multi-plate friction clutch having center lubricant feed and lubricant evacuation capabilities.

BACKGROUND

This section provides background information related to the present disclosure which is not necessarily prior art.

Power transmitting components with a torque transfer device, such as a disconnecting drive module in an all-wheel drive ("AWD") system, generally include a clutch with a plurality of friction plates and a piston for selectively engaging the friction plates. The friction plates are generally bathed in a fluid to provide lubrication and cooling of the plates when the clutch is engaged. When the clutch is disengaged, the plates are generally separated. When separated, excess fluid between the plates and within a clutch sump through which the plates rotate, can increase the system drag torque. It is advantageous to decrease the amount of system drag torque. Minimizing the level of fluid within the clutch sump can reduce the amount of drag torque from the clutch. However, sufficient fluid must be available during engagement of the clutch to prevent excessive temperatures and plate damage. Furthermore, as the clutch rotates, centrifugal force can cause the fluid to move toward the outer parts of the clutch causing uneven distribution of the fluid across the clutch plates. As a result, it can be difficult to maintain the optimal amount and location of fluid within the clutch during both engagement and disengagement.

SUMMARY

This section provides a general summary of the disclosure, and is not a comprehensive disclosure of its full scope or all of its features.

The present teachings further provide for a clutched device including an input member, a first output member, a second output member, a third output member, a differential, a housing, a lubricant fluid, a clutch assembly, a first conduit, and a second conduit. The input member can be configured to receive rotational power and rotate about a first axis. The first, second, and third output members can be configured to rotate about a second axis. The differential can include a differential case and a differential gearset. The differential case can be drivingly coupled to the input member. The differential gearset can be configured to transmit rotary power between the differential case and the first and second output members. The housing can have an inner wall disposed about the second axis and an end wall. The housing can define a first cavity. The end wall and the inner wall can define a clutch cavity. The end wall can separate the clutch cavity from the first cavity. The lubricant fluid can be received in the clutch cavity. The clutch assembly can include an inner carrier, an outer carrier, a plurality of first clutch plates, and a plurality of second clutch plates interleaved with the first clutch plates. The outer carrier can be coupled for rotation with the second output member and can be configured to rotate in a first rotational direction and in a second rotational direction that is opposite the first rotational direction. The inner carrier can be coupled for rotation with the third output member. The first conduit can have a first inlet and a first outlet. The first inlet can be open to the clutch cavity through a first region of the inner wall. The first outlet can be open to the first cavity. The first conduit can couple the clutch cavity to the first cavity for fluid communication from the clutch cavity to the first cavity. The second conduit can have a second inlet and a second outlet. The second inlet can be open to the clutch cavity through a second region of the inner wall that is circumferentially spaced apart from the first region. The second outlet can be open to the clutch cavity and radially inward of the first and second clutch plates. The outer carrier can be configured to sling a first amount of the lubricant fluid from the clutch cavity through the first inlet when rotating in the first rotational direction. The outer carrier can be configured to sling a second amount of the lubricant fluid from the clutch cavity through the second inlet when rotating in the second rotational direction.

The present teachings provide for a clutched device including an input member, a first output member, a second output member, a third output member, a differential, a housing, a lubricant fluid, and a clutch assembly. The input member can be configured to receive rotational power and rotate about a first axis. The first, second, and third output members can be configured to rotate about a second axis. The differential can include a differential case and a differential gearset. The differential case can be drivingly coupled to the input member. The differential gearset can be configured to transmit rotary power between the differential case and the first and second output members. The housing can have an inner wall disposed about the second axis. The housing can define a first cavity, a clutch cavity, a first fluid pathway, and a second fluid pathway. The clutch cavity can be separate from the first cavity. The first fluid pathway can have a first inlet and a first outlet. The first inlet can be open through the inner wall to a first peripheral region of the clutch cavity. The first outlet can be open to the first cavity to permit fluid communication from the clutch cavity to the first cavity through the first fluid pathway. The second fluid pathway can have a second inlet and a second outlet. The second inlet can be open through the inner wall to a second peripheral region of the clutch cavity that is circumferentially spaced apart from the first peripheral region. The second outlet can be open to a central region of the clutch cavity that is radially inward of the second aperture to permit fluid communication from the second peripheral region to the central region through the second fluid pathway. The lubricant fluid can be received in the clutch cavity. The clutch assembly can include an inner carrier, an outer carrier, a plurality of first clutch plates, and a plurality of second clutch plates interleaved with the first clutch plates. The outer carrier can be coupled for rotation with the second output member. The inner carrier can be coupled for rotation with the third output member. The outer carrier can be configured to rotate through the clutch cavity in a first rotational direction and a second rotational direction that is opposite the first rotational direction. The outer carrier can be configured to sling a first amount of the lubricant fluid from the clutch cavity through the first inlet when rotating in the first rotational direction. The outer carrier can be configured to sling a second amount of the lubricant fluid from the clutch cavity through the second inlet when rotating in the second rotational direction.

The present teachings further provide for a clutched device including an input pinion, a first output member, a second output member, a third output member, a differential, a housing, a lubricant fluid, and a clutch assembly. The input pinion can be configured to receive rotational power and rotate about a first axis. The first, second, and third output members can be configured to rotate about a second axis that is transverse to the first axis. The differential can include a ring gear, a differential case, and a differential gearset. The ring gear can be meshingly engaged to the input pinion and can be coupled to the differential case for common rotation about the second axis. The differential gearset can be configured to transmit rotary power between the differential case and the first and second output members. The housing can have an inner wall disposed circumferentially about the second axis and an end wall. The housing can define a first cavity. The end wall and the inner wall can define a clutch cavity that is separated from the first cavity by the end wall. The lubricant fluid can be received in the clutch cavity. The clutch assembly can include an inner carrier, an outer carrier, a plurality of first clutch plates, and a plurality of second clutch plates interleaved with the first clutch plates. The outer carrier can be coupled for rotation with the second output member and can be configured to rotate in a first rotational direction and in a second rotational direction that is opposite the first rotational direction. The inner carrier can be coupled for rotation with the third output member. The housing can define a first channel having a first inlet and a first outlet. The first inlet can be open through a first side of the inner wall. The first outlet can be open to the first cavity. The first channel can extend between the first inlet and the first outlet to couple the clutch cavity to the first cavity for fluid communication from the clutch cavity to the first cavity. The housing can define a second channel having a second inlet and a second outlet. The second inlet can be open through a second side of the inner wall that is opposite the first side. The second outlet can be open to the clutch cavity and radially inward of the first and second clutch plates. The second channel can extend between the second inlet and the second outlet to couple a periphery of the clutch cavity to a central region of the clutch cavity for fluid communication from the periphery to the central region. The central region can be disposed radially inward of the first and second clutch plates. The outer carrier can be configured to sling a first amount of the lubricant fluid from the clutch cavity through the first inlet when rotating in the first rotational direction. The outer carrier can be configured to sling a second amount of the lubricant fluid from the clutch cavity through the second inlet when rotating in the second rotational direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
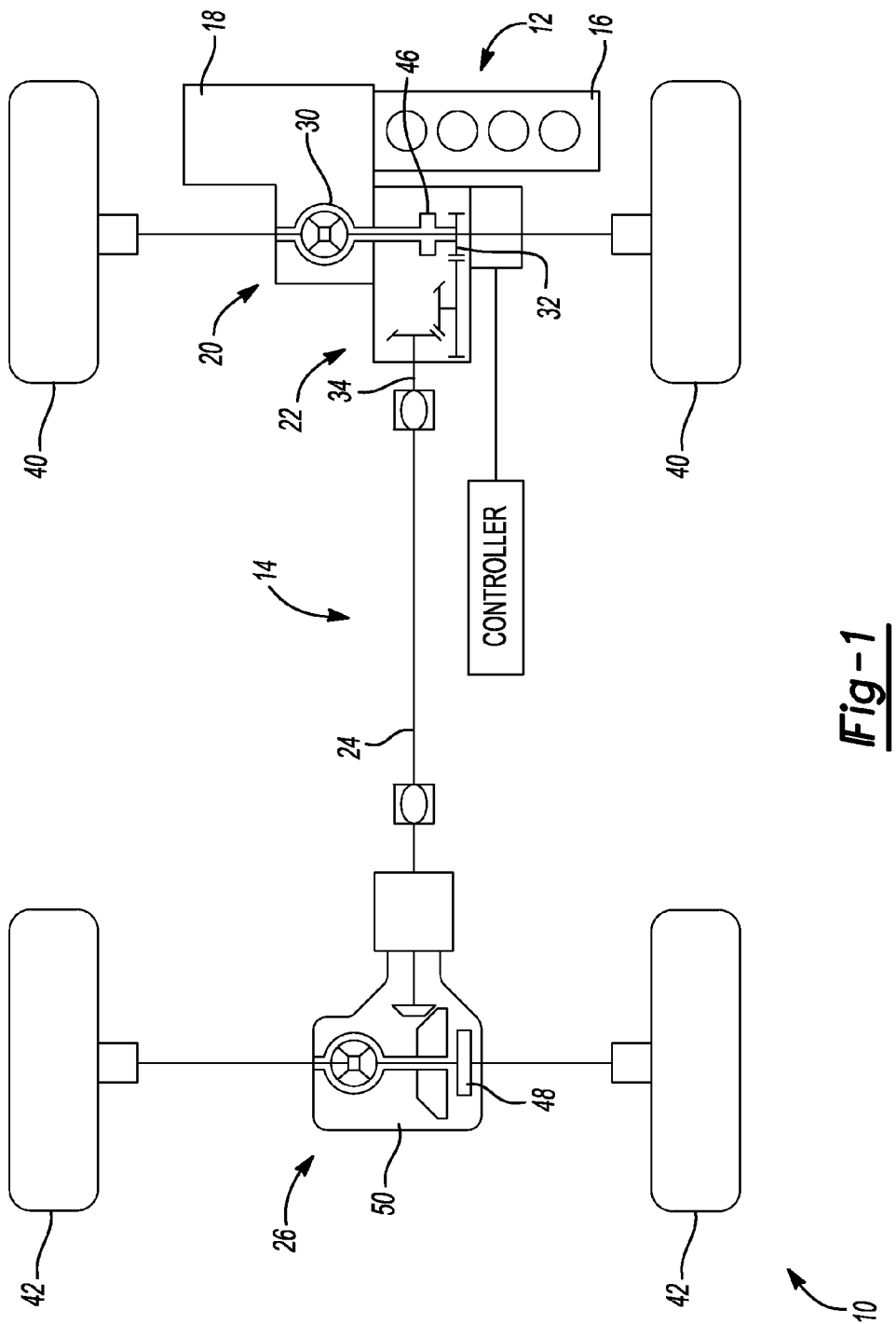
FIG. 1 is a schematic view of a vehicle having a clutched device constructed in accordance with the present teachings.

With reference to FIG. 1 of the drawings, an example of a vehicle having a clutched device constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios.

The drive train 14 in the particular example provided is of an all-wheel drive ("AWD") configuration, but those of skill in the art will appreciate that the teachings of the present disclosure are applicable to other drive train configurations, including four-wheel drive ("4WD") configurations, two-wheel drive ("2WD") configurations, rear-wheel drive ("RWD") configuration, and front-wheel drive ("FWD") configurations. The drive train 14 can include a front axle assembly 20, a power take-off unit (PTU) 22, a prop shaft 24 and a rear axle assembly 26.

The front axle assembly 20 can be configured in any desired manner, such as a front beam axle or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26.

The rear axle assembly 26 can be configured in any desired manner, such as a rear beam axle, an independent rear drive axle, or a rear drive module. The front axle assembly 20 and the rear axle assembly 26 can be driven on a full-time basis to drive front and rear vehicle wheels 40 and 42, respectively. The drive train 14 can include one or more clutches to interrupt the transmission of rotary power through a part of the drive train 14. In the particular example provided, the drive train 14 includes a first clutch 46, which can be configured to interrupt the transmission of rotary power through the PTU 22 (e.g., decouple the input member 30 of the front axle assembly 20 from the PTU input member 32), and a second clutch 48, which can be configured to control rotation of components within the rear axle assembly 26.

In the particular example provided, the rear axle assembly 26 includes a rear drive module 50 (i.e., a clutched device) that is constructed in accordance with the teachings of the present disclosure. It will be appreciated, however, that the teachings of the present disclosure have application to various other clutched devices, such as transmissions, power take-offs, torque transfer devices, transfer cases, front axle assemblies, and any other power transmitting components that have a clutch and a housing forming a clutch sump.

Figure 2:
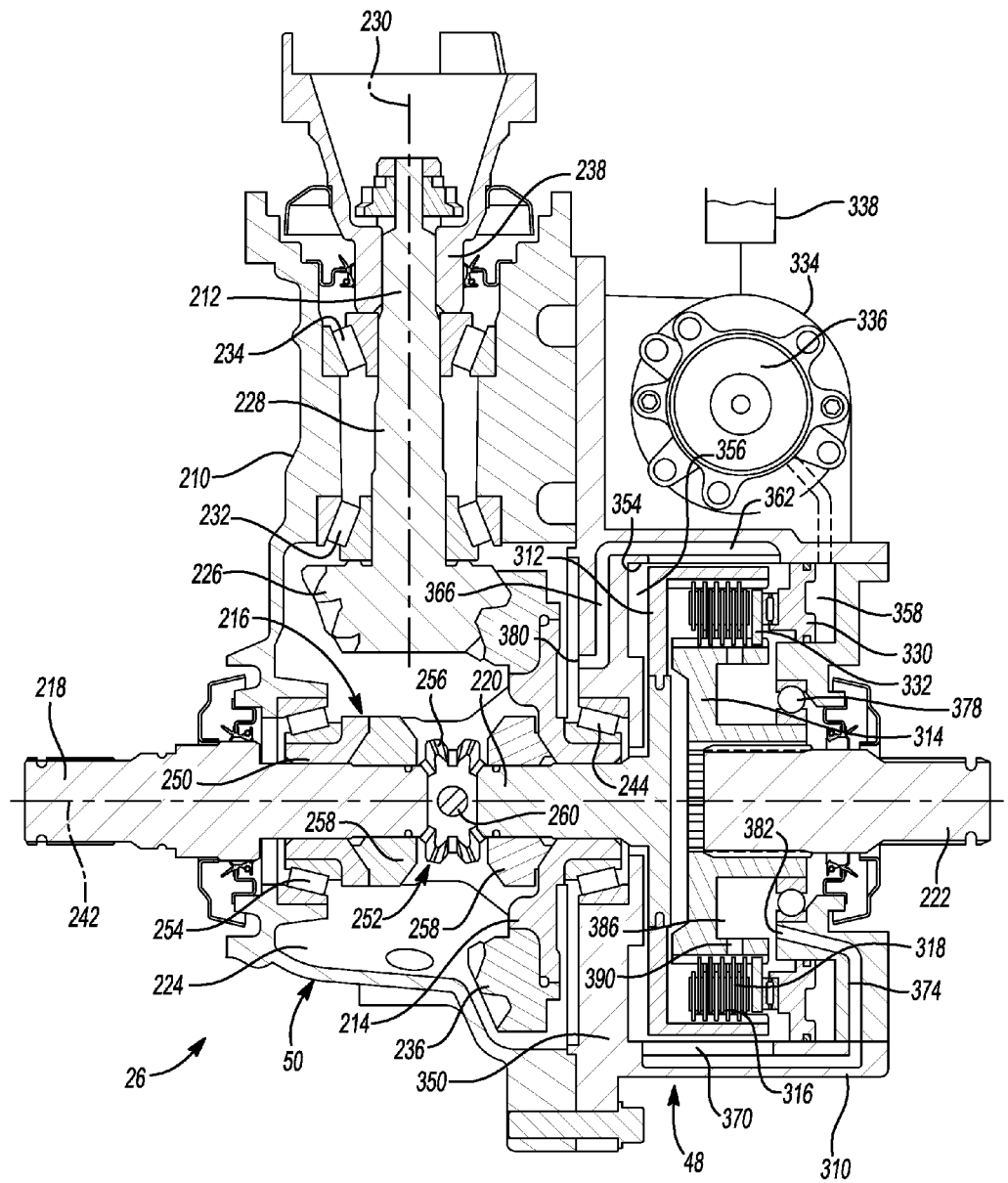
FIG. 2 is a sectional view of the clutched device of FIG. 1, illustrating a clutch cavity and a clutch assembly.

With reference to FIG. 2, the rear drive module 50 is illustrated in more detail. In the example provided, the rear drive module 50 is a type known as a split-shaft drive module. The rear drive module 50 can include a housing 210, an input pinion 212, an input member 214, the second clutch 48, a differential assembly 216, a first output shaft 218, a second output shaft 220, and a third output shaft 222. The housing 210 can define a hypoid gear cavity or first cavity 224 and the input pinion 212 can be a hypoid pinion having a hypoid gear 226, an input pinion shaft 228, and an input pinion flange 238.

The input pinion flange 238 can be drivingly coupled to the prop shaft 24 (FIG. 1). The hypoid gear 226 can be disposed within the first cavity 224. The input pinion shaft 228 can be supported for rotation in the housing 210 along a first axis 230 (e.g., by head bearing 232 and tail bearing 234). The input member 214 can be a ring gear having a gear face 236. The input member 214 can be supported for rotation in the housing 210 about a second axis 242 by a bearing 244. The second axis 242 can be generally transverse or perpendicular to the first axis 230. The gear face 236 can be meshingly engaged with the hypoid gear 226.

The differential assembly 216 can include a differential case 250 and a differential gearset 252. The differential case 250 can be configured for rotation about the second axis 242. The differential case 250 can be drivingly coupled to the input member 214. The differential case 250 can be supported within the housing 210 by a bearing 254 and can be coupled to the input member 214 for common rotation about the second axis 242. The differential gearset 252 can be configured to transmit rotary power between the differential case 250 and the first and second output shafts 218, 220.

In the example provided, the differential gearset 252 includes a pair of side gears 256 (only one of which is shown in FIG. 2) and a pair of output gears 258 disposed within the differential case 250. The side gears 256 can be coupled for rotation with the differential case 250 about the second axis 242 and coupled for rotation relative to the differential case 250 about a cross pin 260. The cross pin 260 can be generally perpendicular to the second axis 242. The output gears 258 can be meshingly engaged with the side gears 256 and configured to rotate about the second axis 242. In the particular example provided, the differential assembly 216 is an open differential.

The first output shaft 218 can be drivingly coupled to one of the output gears 258 and can be coupled for common rotation therewith. The first output shaft 218 can be drivingly coupled to one of the rear wheels 42 (FIG. 1). The second output shaft 220 can be drivingly coupled to the other of the output gears 258 and can be coupled for common rotation therewith. The third output shaft 222 can be drivingly coupled to the other one of the rear wheels 42 (FIG. 1).

The second clutch 48 can be selectively operated to transmit rotary power from the second output shaft 220 to the third output shaft 222. In the particular example provided, the second clutch 48 is a friction clutch that is mounted co-axially with the input member 214 and the differential assembly 216 about the second axis 242. The second clutch 48 can include a clutch housing 310, an outer clutch plate carrier 312, an inner clutch plate carrier 314, a plurality of first clutch plates 316, a plurality of second clutch plates 318, a piston 330, an apply plate 332, a pump 334, a pump motor 336, and a reservoir 338.

The clutch housing 310 can be integrally formed with or partially formed by the housing 210 of the rear drive module 50 or can be separately formed and mounted to the housing 210. The clutch housing 310 can have an inner wall 354 that can be generally cylindrical in shape. The inner wall 354 and an end wall 350 of the housing 210 or the clutch housing 310 can define a clutch cavity or second cavity 356. The end wall 350 can separate the first cavity 224 from the second cavity 356. The inner wall 354 can define an outer radial periphery of the second cavity 356. The clutch housing 310 can also define a piston chamber 358, an evacuation inlet chamber or channel 362, an evacuation pathway or conduit 366, a feed inlet chamber or channel 370, and a feed pathway or conduit 374, described in greater detail below.

The outer and inner clutch plate carriers 312, 314 (also commonly referred to as clutch plate baskets) and the first and second clutch plates 316, 318 can be received in the second cavity 356. The outer clutch plate carrier 312 is non-rotatably coupled to the second output shaft 220 and the plurality of second clutch plates 318, while the inner clutch plate carrier 314 is non-rotatably coupled to the third output shaft 222 and the plurality of first clutch plates 316. The first and second clutch plates 316, 318 are axially slidable relative to the outer and inner clutch plate carriers 312, 314. The second clutch plates 318 can be interleaved with the first clutch plates 316 radially between the outer and inner clutch plate carriers 312, 314. The inner clutch plate carrier 314 and the third output shaft 222 can be supported within the clutch housing 310 for rotation relative thereto by a bearing 378. In the example provided, the bearing 378 is located radially between the inner clutch plate carrier 314 and a portion of the clutch housing 310, though other configurations can be used.

The piston 330 can be an annular shape and received in the piston chamber 358. The piston 330 can be configured to translate along the second axis 242 to move within the piston chamber 358 between an extended position and a retracted position relative to the plurality of first and second clutch plates 316, 318. The pump 334 can be mounted to the housing 210 or the clutch housing 310 proximate to the pinion shaft 228. The pump motor 336 can be a 2-way servo motor capable of running in forward and reverse and can be drivingly coupled to the pump 334 to selectively operate the pump 334.

The pump 334 can be fluidly coupled to the reservoir 338 and fluidly coupled to the piston chamber 358. The reservoir 338 can be configured to hold a hydraulic fluid. The pump 334 can be operated in a first mode to pump the hydraulic fluid in a first direction to supply the hydraulic fluid from the reservoir 338 to the piston chamber 358 to move the piston 330 from the retracted position to the extended position. The pump 334 can be operated in a second mode to pump hydraulic fluid in a second direction to selectively remove hydraulic fluid from the piston chamber 358 to the reservoir 338 to move the piston 330 from the extended position to the retracted position. The reservoir 338 can be mounted to the housing 210 or the clutch housing 310. Alternatively, the reservoir 338 can be integrally formed with the housing 210 or the clutch housing 310.

The apply plate 332 can be disposed in the second cavity 356 axially between the piston 330 and the plurality of first and second clutch plates 316, 318. The piston 330 can be configured to translate the apply plate 332 along the second axis 242 to selectively engage the first and second clutch plates 316, 318 to compress the first and second clutch plates 316, 318 against one another so that the second clutch 48 can transmit rotary power between the second and third output shafts 220, 222. It will be appreciated that the second clutch 48 can be configured to not transmit rotary power between the second and third output shafts 220, 222 when the piston 330 is in the retracted position. The second clutch 48 can also be configured to transmit various levels of torque by varying the position of the piston 330 relative to the first and second clutch plates 316, 318.

Figure 3:
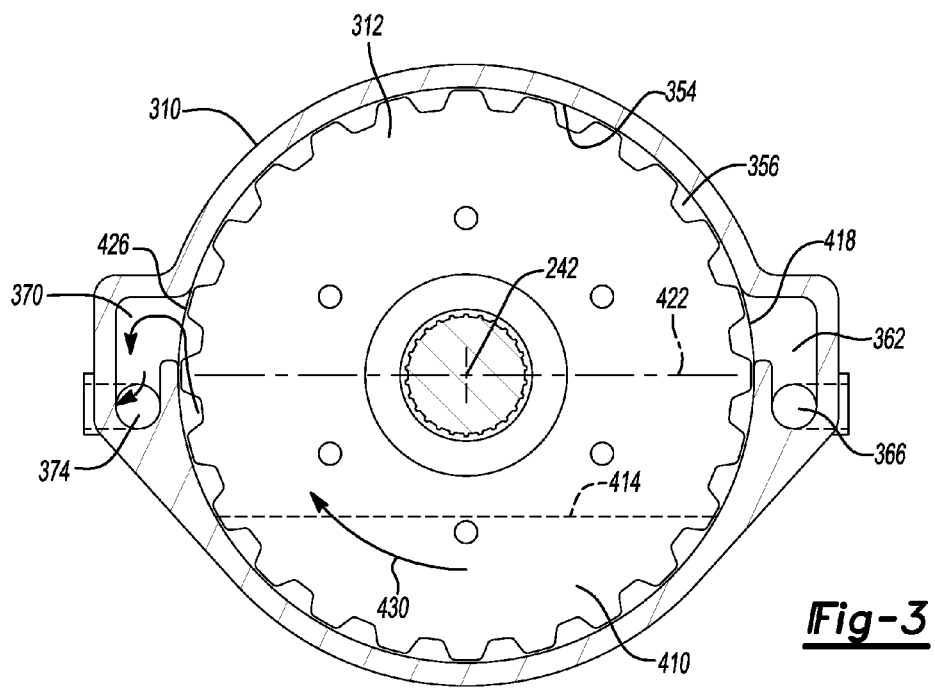
FIG. 3 is a sectional view of a portion of the clutch assembly of FIG. 2, taken along line 3-3 shown on FIG. 2, illustrating a clutch basket rotating in a first rotational direction.
Figure 4:
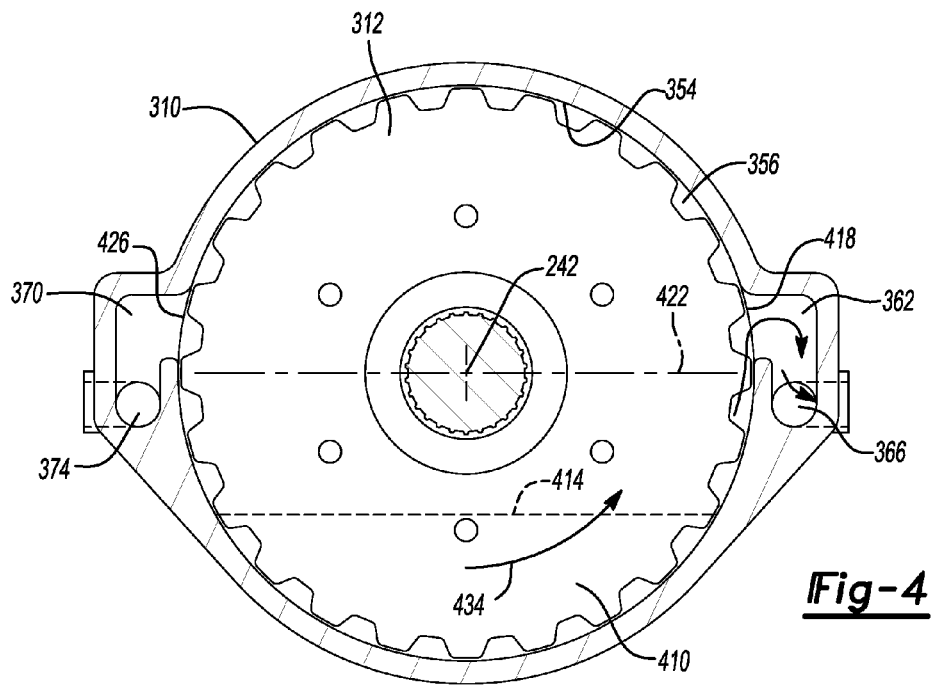
FIG. 4 is a sectional view similar to FIG. 3, illustrating the clutch basket rotating in a second rotational direction.

With continued reference to FIG. 2 and additional reference to FIGS. 3 and 4, the evacuation channel 362 can be open to the second cavity 356 along the inner wall 354 (i.e., at a peripheral region of the second cavity 356). The evacuation channel 362 can be axially aligned with the outer clutch plate carrier 312 and can extend axially along substantially the entire length of the outer clutch plate carrier 312. The evacuation conduit 366 can couple the evacuation channel 362 to another cavity or reservoir that is separate from the second cavity 356. In the particular example provided, the evacuation conduit 366 has an outlet 380 that couples the evacuation channel 362 to the first cavity 224 for fluid communication from the evacuation channel 362 to the first cavity 224. In the particular example provided, the evacuation conduit 366 extends axially within the clutch housing 310 toward the first cavity 224, then radially inward within the clutch housing 310 and the outlet 380 is open to the first cavity 224 at a location that is radially inward of the outer circumference of the input member 214, though other configurations can be used.

In an alternative construction, not specifically shown, the reservoir that is separate from the second cavity 356 can be the reservoir 338 and the evacuation conduit 366 can couple the evacuation channel 362 to the reservoir 338 for fluid communication from the evacuation channel 362 to the reservoir 338. In another alternative construction, not specifically shown, the evacuation conduit 366 can couple the evacuation channel 362 to one or more bearings (e.g., bearings 232, 234, 244, or 254) for example, to provide lubrication fluid thereto.

The feed channel 370 can be open to the second cavity 356 along the inner wall 354 (i.e., at a peripheral region of the second cavity 356) and located on an opposite side of the inner wall 354 as the evacuation channel 362. In the example provided, the feed channel 370 is circumferentially spaced apart from the evacuation channel 362 and is located approximately 180°, or diametrically opposed to the evacuation channel 362, though other configurations can be used. The feed channel 370 can be axially aligned with the outer clutch plate carrier 312 and can extend axially along substantially the entire length of the outer clutch plate carrier 312. The feed conduit 374 can have an outlet 382 that is open to a central region 386 of the second cavity 356 that can be radially inward of the first and second clutch plates 316, 318. In the particular example provided, the inner clutch plate carrier 314 also includes a plurality of apertures 390 that extend radially outward through the inner clutch plate carrier 314 to allow fluid to flow from the central region 386 of the second cavity 356 that is radially inward of the first and second clutch plates 316, 318, through the inner clutch plate carrier 314, and to the first and second clutch plates 316, 318.

With specific reference to FIGS. 3 and 4, a lower portion of the second cavity 356 can define a clutch sump 410 wherein a lubricant fluid can collect up to a static fluid level 414. The static fluid level 414 can be the maximum height of the lubricant fluid when the vehicle 10 is on a level surface, the outer and inner clutch plate carriers 312, 314 are not rotating, and all or substantially all of the lubricant fluid is disposed within the clutch sump 410. In one configuration, the lubricant fluid can be the same type of fluid as the hydraulic fluid received in the reservoir 338. In another configuration, the lubricant fluid and the hydraulic fluid can be different types of fluids.

The evacuation channel 362 can have an evacuation aperture 418 that is open to the second cavity 356 and above the static fluid level 414. In the particular example provided, the evacuation aperture 418 is located at or above a center line 422 that intersects the second axis 242 (FIG. 2) and is level when the vehicle 10 is on a level surface. The evacuation conduit 366 can be located below the evacuation aperture 418 and the inner wall 354 can generally separate the evacuation conduit 366 from the second cavity 356.

The feed channel 370 can have a feed aperture 426 that is open to the second cavity 356 and above the static fluid level 414. In the particular example provided, the feed aperture 426 is located at or above the center line 422. The feed conduit 374 can be located below the feed aperture 426 and the inner wall 354 can generally separate the feed conduit 374 from the second cavity 356.

In operation, the first output shaft 218 and the third output shaft 222 can be coupled to rotate in the same rotational direction as the vehicle's wheel 42 (FIG. 1) to which each is drivingly coupled. When the first and second clutch plates 316, 318 are engaged to transmit torque between the second and third output shafts 220, 222, the outer clutch plate carrier 312 can rotate in the same rotational direction as the vehicle wheel 42 to which the third output shaft 222 is drivingly coupled. When the first and second clutch plates 316, 318 are engaged, the outer clutch plate carrier 312 can rotate in a first rotational direction 430 (FIG. 3).

When the first and second clutch plates 316, 318 are disengaged, the differential gearset 252 causes the second output shaft 220, and thus the outer clutch plate carrier 312 to rotate in the opposite rotational direction as the vehicle wheel 42 to which the first and third output shafts 218, 222 are respectively coupled. Thus, when the first and second clutch plates 316, 318 are disengaged, the outer clutch plate carrier 312 can rotate in a second rotational direction 434 (FIG. 4) that is opposite the first rotational direction 430 (FIG. 3).

With specific reference to FIGS. 2 and 3, when the outer clutch plate carrier 312 rotates in the first rotational direction 430, the outer clutch plate carrier 312 can act on the lubrication fluid in the clutch sump 410 to churn and pull the lubrication fluid in the first rotational direction 430. Some of the lubrication fluid in the clutch sump 410 can cling to the outer clutch plate carrier 312 and can be slung from the outer clutch plate carrier 312 toward the inner wall 354 above the static fluid level 414. Some of the fluid slung onto the inner wall 354 can run down the inner wall 354 and through the feed aperture 426, into the feed channel 370. Some of the lubrication fluid can also be slung from the outer clutch plate carrier 312 directly through the feed aperture 426 and into the feed channel 370.

The rotation of the outer clutch plate carrier 312 in the first rotational direction 430 can cause more of the lubricant fluid can be slung or received into the feed channel 370 than the evacuation channel 362. As the lubricant fluid collects in the feed channel 370, the lubricant fluid can flow from the feed channel 370 to the central region 386 of the second cavity 356 that is radially inward of the outer clutch plate carrier 312, through the outlet 382 of the feed conduit 374. The flow of lubricant fluid through the outlet 382 and into the central region 386 of the second cavity 356 can feed lubricant to the clutch plates 316, 318, while the clutch plates 316, 318 are engaged.

With specific reference to FIGS. 2 and 4, when the outer clutch plate carrier 312 rotates in the second rotational direction 434, the outer clutch plate carrier 312 can act on the lubrication fluid in the clutch sump 410 to churn and pull the lubrication fluid in the second rotational direction 434. Some of the lubrication fluid in the clutch sump 410 can cling to the outer clutch plate carrier 312 and can be slung from the outer clutch plate carrier 312 toward the inner wall 354 above the static fluid level 414. Some of the fluid slung onto the inner wall 354 can run down the inner wall 354 and through the evacuation aperture 418, into the evacuation channel 362. Some of the lubrication fluid can also be slung from the outer clutch plate carrier 312 directly through the evacuation aperture 418 and into the evacuation channel 362.

The rotation of the outer clutch plate carrier 312 in the second rotational direction 434 can cause more of the lubricant fluid to be slung or received into the evacuation channel 362 than the feed channel 370. As the lubricant fluid collects in the evacuation channel 362, the lubricant fluid can flow from the evacuation channel 362 to the first cavity 224, through the evacuation conduit 366. The flow of lubricant fluid through the evacuation aperture 418 and into the first cavity 224 can reduce the amount of lubricant fluid in the clutch sump 410 while the clutch plates 316, 318 are disengaged, to reduce drag.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A clutched device comprising:
    an input member configured to receive rotational power and rotate about a first axis;
    a first output member, a second output member, and a third output member, the first, second, and third output members configured to rotate about a second axis;
    a differential including a differential case and a differential gearset, the differential case being drivingly coupled to the input member, the differential gearset being configured to transmit rotary power between the differential case and the first and second output members;
    a housing having an inner wall disposed about the second axis and an end wall, the housing defining a first cavity, the end wall and the inner wall defining a clutch cavity, the end wall separating the clutch cavity from the first cavity;
    a lubricant fluid received in the clutch cavity;
    a clutch assembly including an inner carrier, an outer carrier, a plurality of first clutch plates, and a plurality of second clutch plates interleaved with the first clutch plates, the outer carrier being coupled for rotation with the second output member and configured to rotate in a first rotational direction and in a second rotational direction that is opposite the first rotational direction, the inner carrier being coupled for rotation with the third output member;
    a first conduit having a first inlet and a first outlet, the first inlet being open to the clutch cavity through a first region of the inner wall, the first outlet being open to the first cavity, the first conduit coupling the clutch cavity to the first cavity for fluid communication from the clutch cavity to the first cavity; and a second conduit having a second inlet and a second outlet, the second inlet being open to the clutch cavity through a second region of the inner wall that is circumferentially spaced apart from the first region, the second outlet being open to the clutch cavity and radially inward of the first and second clutch plates;

wherein the outer carrier is configured to sling a first amount of the lubricant fluid from the clutch cavity through the first inlet when rotating in the first rotational direction; and wherein the outer carrier is configured to sling a second amount of the lubricant fluid from the clutch cavity through the second inlet when rotating in the second rotational direction.

2. The clutched device of claim 1, wherein the first and second inlets are disposed above a center line of the clutch cavity.

3. The clutched device of claim 1, wherein the second outlet is in fluid communication with a central region of the clutch cavity that is radially inward of the first and second clutch plates, and wherein the inner carrier defines a plurality of apertures that extend radially outward from the central region to fluidly couple the central region with the first and second clutch plates.

4. The clutched device of claim 1, wherein the second axis is transverse to the first axis.

5. The clutched device of claim 4, wherein the differential includes a ring gear coupled to the differential case for common rotation and the input member includes a pinion gear meshingly engaged with the ring gear, the ring gear and the pinion gear being disposed within the first cavity.

6. The clutched device of claim 1, wherein the differential is an open differential.

7. The clutched device of claim 1, wherein the first and second inlets are diametrically opposed about the second axis.

8. The clutched device of claim 1, wherein the first and second conduits are defined by the housing.

9. A clutched device comprising:
an input member configured to receive rotational power and rotate about a first axis;
a first output member, a second output member, and a third output member, the first, second, and third output members configured to rotate about a second axis;
a differential including a differential case and a differential gearset, the differential case being drivingly coupled to the input member, the differential gearset being configured to transmit rotary power between the differential case and the first and second output members;
a housing having an inner wall disposed about the second axis, the housing defining a first cavity, a clutch cavity, a first fluid pathway, and a second fluid pathway, the clutch cavity being separate from the first cavity, the first fluid pathway having a first inlet and a first outlet, the first inlet being open through the inner wall to a first peripheral region of the clutch cavity, the first outlet being open to the first cavity to permit fluid communication from the clutch cavity to the first cavity through the first fluid pathway, the second fluid pathway having a second inlet and a second outlet, the second inlet being open through the inner wall to a second peripheral region of the clutch cavity that is circumferentially spaced apart from the first peripheral region, the second outlet being open to a central region of the clutch cavity that is radially inward of the second aperture to permit fluid communication from the second peripheral region to the central region through the second fluid pathway;

a lubricant fluid received in the clutch cavity; and a clutch assembly including an inner carrier, an outer carrier, a plurality of first clutch plates, and a plurality of second clutch plates interleaved with the first clutch plates, the outer carrier being coupled for rotation with the second output member, the inner carrier being coupled for rotation with the third output member, the outer carrier being configured to rotate through the clutch cavity in a first rotational direction and a second rotational direction that is opposite the first rotational direction;

wherein the outer carrier is configured to sling a first amount of the lubricant fluid from the clutch cavity through the first inlet when rotating in the first rotational direction; and wherein the outer carrier is configured to sling a second amount of the lubricant fluid from the clutch cavity through the second inlet when rotating in the second rotational direction.

10. The clutched device of claim 9, wherein the first and second inlets are disposed on opposite sides of the clutch cavity.

11. The clutched device of claim 10, wherein the first and second inlets are above a center line of the clutch cavity.

12. The clutched device of claim 9, wherein the central region of the clutch cavity is radially inward of the first and second clutch plates.

13. The clutched device of claim 12, wherein the inner carrier defines a plurality of apertures that extend radially outward from the central region of the clutch cavity to fluidly couple the central region with the first and second clutch plates.

14. The clutched device of claim 9, wherein the second axis is transverse to the first axis.

15. The clutched device of claim 14, wherein the differential includes a ring gear coupled to the differential case for common rotation and the input member includes a pinion gear meshingly engaged with the ring gear, the ring gear and the pinion gear being disposed within the first cavity.

16. A clutched device comprising:
an input pinion configured to receive rotational power and rotate about a first axis;
a first output member, a second output member, and a third output member, the first, second, and third output members configured to rotate about a second axis that is transverse to the first axis;
a differential including a ring gear, a differential case, and a differential gearset, the ring gear being meshingly engaged to the input pinion and coupled to the differential case for common rotation about the second axis, the differential gearset being configured to transmit rotary power between the differential case and the first and second output members;
a housing having an inner wall disposed circumferentially about the second axis and an end wall, the housing defining a first cavity, the end wall and the inner wall defining a clutch cavity that is separated from the first cavity by the end wall;
a lubricant fluid received in the clutch cavity; and
a clutch assembly including an inner carrier, an outer carrier, a plurality of first clutch plates, and a plurality of second clutch plates interleaved with the first clutch plates, the outer carrier being coupled for rotation with the second output member and configured to rotate in a first rotational direction and in a second rotational direction that is opposite the first rotational direction, the inner carrier being coupled for rotation with the third output member;

wherein the housing defines a first channel having a first inlet and a first outlet, the first inlet being open through a first side of the inner wall, the first outlet being open to the first cavity, the first channel extending between the first inlet and the first outlet to couple the clutch cavity to the first cavity for fluid communication from the clutch cavity to the first cavity;

wherein the housing defines a second channel having a second inlet and a second outlet, the second inlet being open through a second side of the inner wall that is opposite the first side, the second outlet being open to the clutch cavity and radially inward of the first and second clutch plates, the second channel extending between the second inlet and the second outlet to couple a periphery of the clutch cavity to a central region of the clutch cavity for fluid communication from the periphery to the central region, the central region being disposed radially inward of the first and second clutch plates;

wherein the outer carrier is configured to sling a first amount of the lubricant fluid from the clutch cavity through the first inlet when rotating in the first rotational direction; and wherein the outer carrier is configured to sling a second amount of the lubricant fluid from the clutch cavity through the second inlet when rotating in the second rotational direction.

17. The clutched device of claim 16, wherein the lubricant fluid defines a static fluid level in the clutch cavity, the static fluid level being a maximum level of the lubricant fluid in the clutch cavity when the inner and outer carriers are not rotating, the first and second inlets being disposed above the static fluid level.

18. The clutched device of claim 16, wherein the first and second inlets are above a center line of the clutch cavity.

19. The clutched device of claim 16, wherein the inner carrier defines a plurality of apertures that extend radially outward from the central region of the clutch cavity to fluidly couple the central region with the first and second clutch plates.

20. The clutched device of claim 16, wherein the differential is an open differential.

* * * * *